United States Patent
Heath et al.

(10) Patent No.: US 9,984,268 B2
(45) Date of Patent: May 29, 2018

(54) CODE FOR ANIMAL ID MARKING

(71) Applicant: Vium, Inc., San Mateo, CA (US)

(72) Inventors: Kyle Howard Heath, Menlo Park, CA (US); Jonathan Betts-Lacroix, Belmont, CA (US)

(73) Assignee: Vium, Inc., San Mateo, CA (US)

( * ) Notice: Subject to any disclaimer, the term of this patent is extended or adjusted under 35 U.S.C. 154(b) by 0 days. days.

(21) Appl. No.: 15/252,699

(22) Filed: Aug. 31, 2016

(65) Prior Publication Data

US 2018/0060629 A1    Mar. 1, 2018

(51) Int. Cl.
*G06K 5/00*     (2006.01)
*G06K 7/14*     (2006.01)
*G06K 7/10*     (2006.01)

(52) U.S. Cl.
CPC ....... *G06K 7/1413* (2013.01); *G06K 7/10366* (2013.01)

(58) Field of Classification Search
CPC ................. G06K 7/1413; G06K 7/10366
See application file for complete search history.

(56) References Cited

U.S. PATENT DOCUMENTS

| | | | | |
|---|---|---|---|---|
| 3,916,550 A * | 11/1975 | Dzus | ...... | A01K 11/00 40/300 |
| 5,711,246 A * | 1/1998 | Yano | ...... | A01K 11/006 119/51.02 |
| 5,725,261 A * | 3/1998 | Rahn | ...... | A01K 11/001 292/307 R |
| 6,545,604 B1 * | 4/2003 | Dando | ...... | A22B 5/0064 340/572.1 |
| 2002/0066418 A1 * | 6/2002 | Fearing | ...... | A01K 11/004 119/859 |
| 2012/0226288 A1 * | 9/2012 | Mays | ...... | A01K 11/00 606/116 |
| 2016/0037749 A1 * | 2/2016 | Gandola | ...... | A01K 11/006 600/301 |
| 2016/0125276 A1 * | 5/2016 | Spicola, Sr. | ...... | A01K 11/008 382/110 |
| 2017/0293782 A1 * | 10/2017 | Thuss | ...... | G06K 7/10366 |

* cited by examiner

*Primary Examiner* — Christle I Marshall
*Assistant Examiner* — Asifa Habib
(74) *Attorney, Agent, or Firm* — Kim Rubin

(57) ABSTRACT

An animal identification code is described comprising two numbers, one of which is encoded into a human-readable marking and the other of which is encoded into a machine-readable marking, where the two numbers and the two encodings are different. The combination of the two numbers, plus additional information not marked on a first animal, such as time of read, is looked up a first table to determine conditional validity and from there to a second table to determine a valid and unique animal ID associated with the animal, a primary key. The animal may be a rodent in a vivarium and the markings may be tattooed on the animal tail. The second marking may be a vine code with a spine where the spine is aligned with the animal tail. The first number may be unique within a first animal population such as an animal study. The combination of the first and second marking may be reused on a second animal wherein the lifetimes of the first and second animal do not overlap. The primary key is unique among all animals in a third population, dead or alive.

3 Claims, 8 Drawing Sheets

Fig. 5A
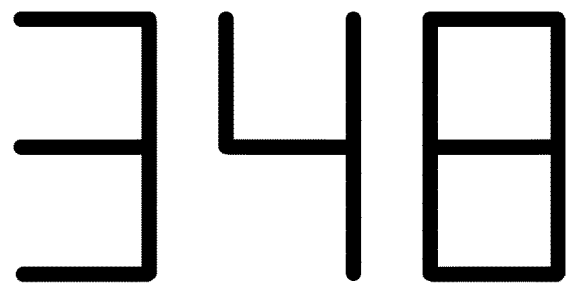
Fig. 5B
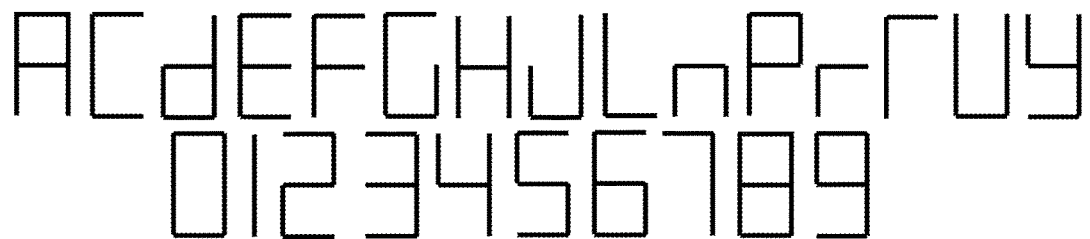
Fig. 5C
B I K M O Q S V W X Z

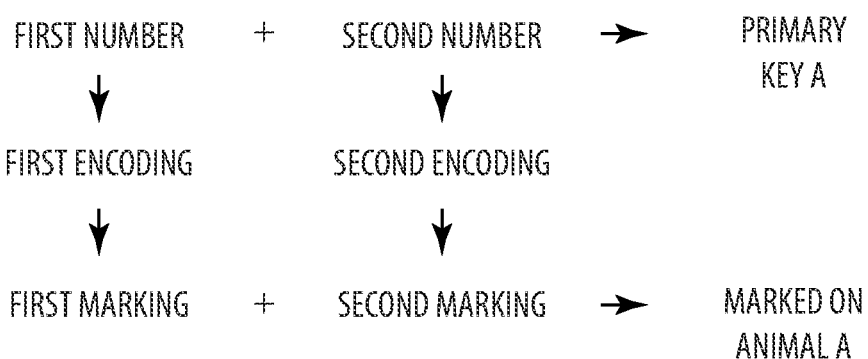
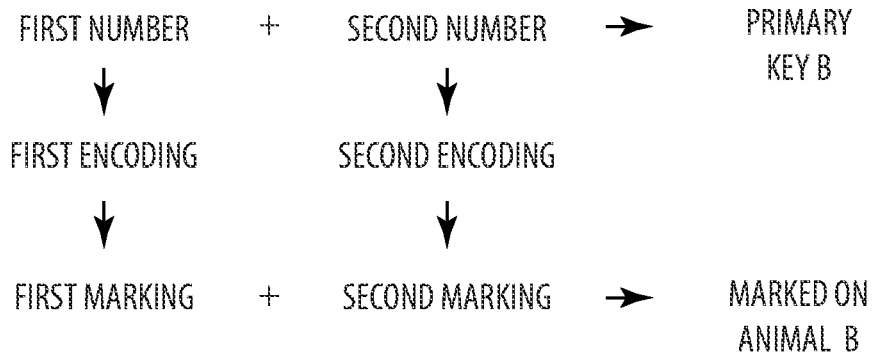

CODE FOR ANIMAL ID MARKING

FIELD OF THE INVENTION

The invention relates to management of animals in a vivarium for both husbandry and study purposes. More specifically it relates to uniquely identifying animals in the vivarium. Yet more specifically, it is directed to marking, such as by tattooing, both machine-readable and human-readable identification markings on an animal, such as tattooing a combination of alphanumerics and a barcode on the tail of a rodent.

BACKGROUND

Vivaria house a number of animals, typically test animals, such as mice, in a number of cages, often a large number. The test animals are frequently used to test drugs, genetics, animal strains, husbandry experiments, methods of treatment, procedures, diagnostics, and the like. We refer to all such uses of a vivarium as a study.

The animals in a vivarium must be observed, either manually by humans or by automated means, such as by the use of video cameras and image processing. Observations and comparisons of animals are the basis of study results.

There are a large number of animal characteristics, attributes, or behavior that may be of interest in a study. We refer to all such observable aspects of animals as "behaviors," including blood, saliva, feces, urine, breath, and fur attributes. Observations of behaviors may be manual or automated and may be invasive or non-invasive. They may occur in the animal's home cage; or in a separate observation or test cage or apparatus; or via pathology or other chemical, biological or analytical analysis. Observations and results may use statistics or aggregated behaviors.

For observing all such behaviors, it is critical that the observed behaviors be reliably, easily, and quickly linked to one particular animal. It is also necessary that marking the animals be consistent, fast, reliable and low cost. Prior art uses a variety of animal identification systems, including one animal per cage, ear notches, ear tags, foot and toe pad tattooing, embedded RFID, attached RFID, body tattoos, and tail tattoos. Some prior art uses human-readable markings, such as ear notches or ID numbers tattooed on a tail. Some prior art uses machine-readable markings, such as RFIDs, ear-tag barcodes, and tail barcodes.

In an ideal world, each animal might receive a globally unique ID that is never re-used. However, that requires a large code space, which in return requires complex markings. Small animal tails are a poor choice substrate for placing printed codes. Complex codes either cannot be marked at all, or do not read reliably. In prior art practice, markings are often in a very small code space and other systems are used to uniquely identify an animal. One such prior art method is a marking that is unique only within a single cage. For example, colored ear tags may be used, with only five colors available. Alternatively, ear notches may be used providing a code space size of less than 100. Another prior art method uses unique markings within a single study. Animals in one study are generally kept well apart from animals in another study; thus, unique marking within one study may be sufficient.

All such prior art has significant weaknesses. For machine-readable markings weaknesses include:
risk of confusing one animal with another, for example, if an animal is moved to a wrong cage
not human-readable
slow reading
requires specialized equipment
expensive equipment and expensive to read
computer required to read and map animal ID
may have single-vendor lock-in
two hands often required to use equipment
accuracy and reliability may not be computable or traceable
slow and expensive to mark animals
limited through rate for marking new animals
animals may have to be a minimum age to mark
may work only in-cage or may work only out-of-cage
either applying marks or reading marks may not be sterile
animal may have to anesthetized to be marked.
For human-readable markings weaknesses include:
risk of confusing one animal with another, for example, if an animal is moved to a wrong cage
often not machine-readable
may not be readable in the dark—the animals' natural activity period
reading may be unreliable
typically has a small code space
requires manual data entry to link animal ID to stored data
likely not suitable for machine marking
high labor cost for marking
accuracy and reliability may not be computable or traceable
limited through rate for marking new animals
slow through rate for marking new animals.
Embodiments of this invention overcome many of the weaknesses of prior art.

SUMMARY OF THE INVENTION

A problem to be solved is how to place a reliably readable code or marking on an animal using a small code space and yet maintain unique animal identification within a required set or subset of animals.

The prior art uses either simple, large markings in a small space for reliability, such as five colors of animal ear tags; or uses many smaller markings taking up a large space, such a barcode, to achieve uniqueness within a larger population of animals. In the first prior art, uniqueness is achieved only over a very small population, such animals in a single cage. In the second prior art, both convenience, such as human readability, and reliability, such as by using tiny markings, is lost.

This invention achieves the above goals of reliability, readability, and uniqueness by using two markings, one human-readable and one machine-readable, and also by associated the pair of markings with a time window corresponding to the life of an animal. The pair of markings may then be re-used on a different animal with a non-overlapping lifetime. In addition, the human-readable markings may be selected such that they are unique within a smaller population, such as a single study. The first marking is associated with a first number, and the second marking with a second number. Marking and number may or may not be the same. A combination of the first number, the second number and a time window is mapped into a primary key that is unique for all animals ever placed in the vivarium.

Thus, there are three exemplary scenarios for using such an invention:

First, a human technician observing or handling animals within a study need only observe, memorize briefly, and then record a short number of characters (the human-readable marking) for each animal. Alternatively, the technician may be prompted with a short number and then needs only confirm that the right animal is selected or observed. The short number assures reliable human reading and reliable short-term memorization.

Second, machine vision is used to read both the human-readable markings and the machine-readable markings on all live animals in the vivarium. This pair of markings is unique for all live animals in the vivarium. In this way, no live animal can be mistaken for any other live animal.

Third, machine vision is used to read both the human-readable marking and the machine-readable marking on all animals in the vivarium in a brief time period, such as one day or one minute. This pair of markings, plus the read time, is then mapped to a fully unique primary key for each animal. In this way, no animal can be mistaken for any other animal, dead or alive, within the time the system in place in one or more vivaria.

Two mapping tables may be used. The first mapping table uses a combination of the first number and the second number, and a time, as an index. A valid entry in the first table maps to a second table with a primary key, which is a unique identifier for all animals, dead or alive. The second table provides additional information about the animal. The first table may be used as a preliminary read validity check. The second table provides a final read validity check.

A human-readable marking may be a few digits. A machine-readable marking may be a vine code or a modified vine code with a spine.

BRIEF DESCRIPTION OF THE DRAWINGS

FIG. 5A shows an exemplary human-readable marking.
FIG. 5B shows an exemplary human-readable symbol set.
FIG. 5C shows an exemplary set of capital letters missing from a human-readable symbol set.
FIGS. 9A and 9B illustrate one exemplary embodiment.

DETAILED DESCRIPTION OF THE INVENTION

Figure 1:
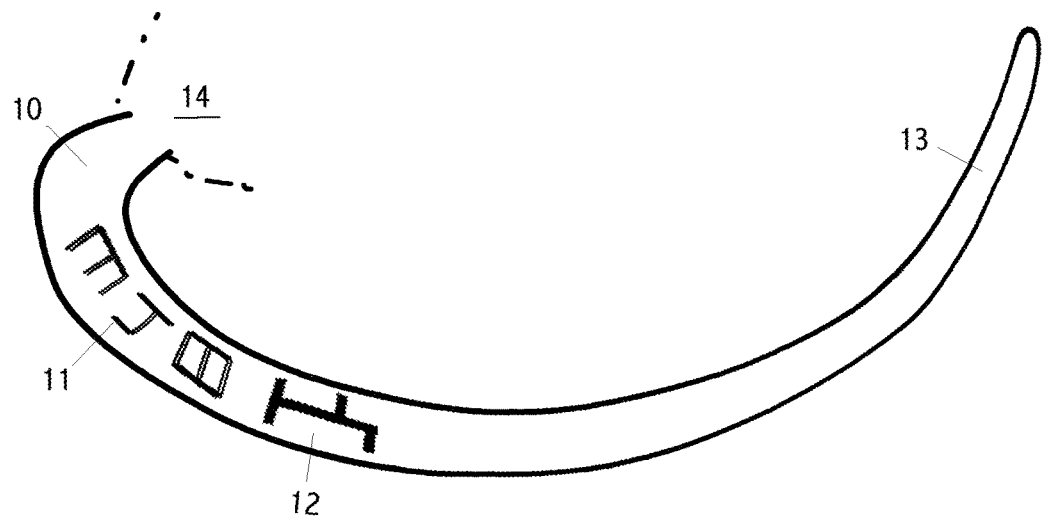
FIG. 1 shows a rodent tail with a combined marking tattooed.

Prior art barcodes use one code or marking to identify an object. Most often, the barcode is essentially a font or encodes a number, such as a decimal or a binary number. The characters or number encoded is then the object identifier. Within some context or scope, that identifier is hopefully unique. Prior art barcodes generally assume reliable printing or marking, with some codes allowing for read errors by means of check digits, parity, CRC, checksums, or forward error correction. Prior art also assumes a uniform or consistent surface on which the barcode is printed or placed.

Animal ID marking, particularly for animals in a vivarium, including but not limited to rodents, have several unique requirements.

First, marking may not be reliable. In fact, if marking is accomplished by tattooing then marking errors may occur more frequently than reading errors. Thus, it is desirable to have a code that allows for correction of mismarked code symbols.

Second, not only is there limited space on which to place animal IDs, particularly on a rodent tail, but also the idealized codes space is large: being ideally globally unique codes for all animals for all time. These two conditions are in direct conflict, as a large code space requires a physically larger mark, for a given resolution and desired reliability.

Third, accuracy of reading animal ID is critical in a vivarium. A single misread ID may compromise or invalidate a study. Thus, not only should reads be valid, but also error rates should be computable so as to provide a credible confidence level for both ID reads and study results.

Fourth, there is typically a requirement for an animal code to be both human-readable and machine-readable. While such a requirements exists in many other barcode applications and is solved by simply replicated the data once as a machine-readable barcode and again as human-readable text, the space for marking animal ID is extremely limited and thus this space-inefficient duplication of the same information is not practical.

Fifth, the human-readable marking should be one that is quickly and easily memorized by a human technician or handler, who may well have both hands full and thus not able to readily copy an animal code onto paper or a keyboard. This requirement indicates a short code should be used, using symbology that is easy for people to memorize quickly and reliably. However, a short code is in direct conflict with desire to support a large code space.

Sixth, a rodent tail is long and thin. Therefore, at least for the machine-readable marking, an output symbology that uses short-height or short-width symbols is desirable. While prior art barcodes, as parallel lines, support short symbols, prior art barcodes are inadequate for this application, as explained herein.

Seventh, a common method of marking rodent tails is by use of tattoo. Tattoo heads mark points or lines at effectively a fixed width. Prior art barcodes typically use variable line width a part of the code. Such variable width lines are not compatible with standard tattoo heads.

Eight, rodent tails are live and change length as the animal grows. In addition, the tails both grow unevenly. In addition, live animal tail curvature typically changes rapidly. Prior art barcodes typically use variable line spacing as part of the code. Such variable width line spacing is not compatible with realities of changing tail length, curvature and space due to growth and live animal activity.

Ninth, controlling a tattooing head, with respect to a rodent tail, is difficult for both manual and automated operation. Therefore, the symbology used must mitigate these practical limitations. In particular, short line segments and diagonal lines are less reliably formed than perpendicular lines and line segments in one of a small number of fixed lengths.

Tenth, because live rodent tails changes shape rapidly, it is desirable to have a symbology that inherently provides local curvature information. Although humans are excellent at reading text on curves, automated systems are not. Prior art barcodes do not support dynamically curving substrates.

Eleven, the width (diameter) of a rodent tale tapers from somewhat wide near the animal to narrow near the tip of the tale. Because of the very limited area in which to mark a rodent tale, it is desirable to have a code that takes advantage of the "tapered aspect ratio" of the rodent tail. Prior art barcodes assume a consistent, rectangular aspect ratio of the available substrate area. In addition, because much of the tail is narrow, in practice, only a portion of the tail nearest the animal body is suitable for marking readable codes.

Twelfth, it is critical in vivarium applications that reading animal IDs is both highly reliable and that reliability (error rate) is computable. Some prior art uses "check digits" to catch errors. However, check digits are very inefficient. For example, a single check digit, assuming uniform and random errors, catches only 90% of errors, leaving a 10% uncaught error rate. To get a 0.1% (one out of one thousand) error rate it is necessary to use three check digits. If the animal code is three digits to start with, then the use of check digits doubles the necessary animal area. Some codes use error correction, such as parity or Reed-Solomon codes. Such error correction is most efficient for longer data blocks. The short data blocks of the animal ID do not support efficient error correction. For example, a 20-bit animal code would typically require another 14 bits for Reed-Solomon bits. Therefore, forward error correction is not an effective means to detect read errors in this application.

Thirteenth, many prior art methods of marking animals, including rodents, requires anesthetizing the animal prior to marking. Such anesthetizing is slow, expensive, stresses the animals, and requires specialized equipment. Placement of RFIDs or marking areas other than the tail typically requires anesthetizing. Some prior art marking methods, such as notching ears or punching in ear tags is painful for the animal and stresses the animal.

Fourteenth, it is desirable to minimize the cost of marking each animal; minimize the need for specialized equipment; minimize reliance on a single vendor for equipment or supplies; minimize the need for specialized training of the humans doing the marking; and provide for high throughput of marking new animals. Prior art methods generally are time consuming to mark, making them costly; or use specialized equipment or vendor-lock-in equipment or supplies (including ink cartridges or pre-manufactured ear tags); or are difficult to perform, requiring specialize training, which also limits the number of personnel available for marking and also limits throughput. Specialized equipment may also limit throughput.

Fifteenth, because it is desirable to keep code size at a minimum subject to all other requirements, it is desirable to be able to "re-use" animal codes, even if full animal IDs are not reused. Prior art barcodes, being effectively fonts, do not permit effective index tables (such as in a database) that may be updated to permit re-use of animal codes. Note that we here distinguish between the "animal code" or "animal marking," which is marked on the animal, and the "animal ID," which is the ID associated with the animal for data recording and is unique within the scope of that animal ID. Such a unique animal ID may be called a primary key. A first table may be used to convert the animal code to the animal primary key, where the index into the first table is the animal code and a field at that line of the table is the primary key, as well as optional other data about either the animal code or the animal, or other related data. For this use, the animal code may also be called a "token," and the table called a "token table." A second table, indexed by the primary key, typically provides much more information about the animal. Code read validity may be determined first by the first table and then finally by the second table.

Sixteenth, it is desirable to integrate the animal management, including marking and reading, with computer data about the animals, studies and vivarium. Prior art barcodes, being simple font representations of predetermined text strings or numbers, have no inherent integration. In addition, such integration is typically always required in a vivarium. Prior art codes do not take advantage of such integration to implement the desired features of animal making and animal codes, as described herein, or to mitigate weaknesses, as described herein. Therefore, it is desirable to take advantage of computer integration, computer databases, and computerized number selection, as part of the animal marking and animal ID system.

Seventeenth, prior art animal marking codes and methods often use small or extremely small code spaces. The minimum effective code space is marking uniquely each animal in one cage. For this purpose, sometimes colors are used. Five colors limit the number of animals in a cage to five. In addition, colors are typically not easily machine-readable. In particular, they cannot be read in infrared light, meaning they cannot be read during the normal nocturnal activity period of mice. Ear notches might have a code space of about 20, which is adequate for one cage. However, ear notches hurt the animals and are also subject to a large human error rate as some notches may not be seen, or the ears may become damaged, or a human reader may mix up the two ears. Ear notches are very difficult to machine-read.

Eighteenth, it is desirable to be able to have a human-readable marking available to a human if both of the human's hands are full. This means that the need to hold a barcode reader to read a mouse ID is undesirable. In addition, the need for a barcode reader for every mouse interaction is time-consuming and requires a large amount of expensive, specialized equipment.

Nineteenth, barcoded ear tags are undesirable because (i) they are expensive; (ii) they have single-vendor lock-in; (iii) they may not be available with the codes desired; (iv) they are not directly human-readable; (v) they require both operator hands to use (one to hold the mouse and one to hold the reader); (vi) they typically require the operation to be online to a computer in order to read the mouse ID. Paper and pencil may not be substituted, even temporarily; (vii) they may not be tolerated by the mouse; (viii) they may be chewed by other mice; (ix) relatively small amounts of detritus, such as food or blood, will make the code unreadable; (x) the animal will not do any self-cleaning of the ear tag. (However, they will self-clean their own tails.)

Twentieth, and of particular importance, animal IDs in a vivarium are typically needed in two separate scopes: the first scope is within one study and the second scope includes the entire vivarium. A scope of a single cage is poor for several reasons. One is that the cage number must be used in order to make the mouse ID unique within a study. This introduces several sources of errors and also makes cage swapping, or moving mice between cages both cumbersome and error prone, as the indexing system must be properly and timely updated. It also means that mice from more than one cage cannot be intermixed. If they are accidentally intermixed, all those mice must be removed from the study immediately. Therefore, it is strongly desirable that a mouse ID be unique within a single study. Study sizes may vary from about five mice up to many hundreds. Therefore, a codes space of at least five hundred is typically necessary for animal ID within a study. Animals from different studies are rarely intermixed. Often the cages for one study are physically segregated from cages used in another study. Therefore, often knowing only the animal ID unique for one study is adequate for a large percent of animal handling and animal ID activities. It is advantageous to have the animal code unique to a study to be human-readable, as this meets many of the above numbered requirements or desires.

Figure 8:
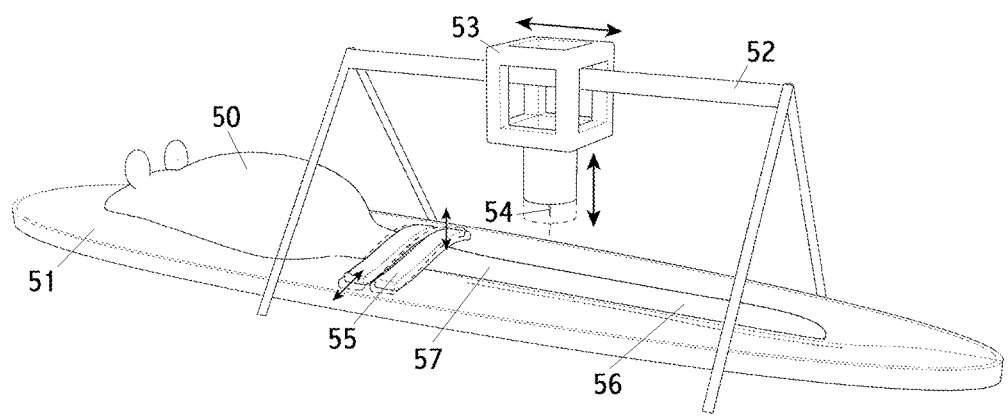
FIG. 8 shows an automated or manual device for tattooing rodent tails.

Twenty-first, it is desirable to be able to use both a machine, such as shown in FIG. 8, and manual marking, to mark codes on animal tails. Typically, barcodes are too complex to mark by hand.

With regards to the scope being the entire vivarium, it is necessary at various times and locations to assure than animals from one study are unquestionably part of that study, and that study animals are not intermixed, and that the absolute identity of every animal within a vivarium, or within a group of vivaria which might ever move or share animals, be known without risk of error, or with an extremely small and computable error. Thus, animals need to be permanently marked in some way with a code space equal to the maximum possible number of animals in a vivarium, and in addition provide some means of validating valid reads of this animal code. Such a code space is in the range of 100,000 to one million, and might even be larger in some applications.

We use the term "animal code" or "marked code" for one or more marked codes that are placed on the animal. These consist of symbols from a code output symbol set. The number of symbols used in the marked code determines the size of the code space.

We use the term "animal ID" as a unique ID for an animal within a study or within another scope. There may be a mapping from one or more the marked codes to an animal ID.

Embodiments of this invention include marking codes on an animal using a combination comprising both a machine-readable portion and a human-readable portion.

Embodiments of this invention place codes via tattooing on a rodent tail.

Embodiments of this invention include a human-readable portion that is also machine-readable.

The machine-readable portion, in one embodiment, is a vine code. A particular code is described below. A variation on prior art codes includes the use of a "spine" marking perpendicular to the normal code lines.

The human-readable portion is, in one embodiment, one or more alphanumeric characters from a reduced set of alphanumeric characters where the reduced set has the attributes of (i) symbols that are easily mistaken for a different symbol are deleted from the symbol set; (ii) all symbols may be drawn and easily read using only orthogonal, linear line segments.

In one embodiment, the human-readable portion comprises the digits 0-9, which may be marked with a combination of straight lines often referenced to "seven-segment" digits.

In one embodiment, the code space size of the human-readable portion is appropriate to provide a unique code for each animal in a study, assuming the largest reasonable study size.

In one embodiment, the human-readable portion of the animal code is an index that maps to a sparse index table, wherein the index table provides a unique animal ID for animals within one study. Indexes may be re-usable in other parallel or future studies.

In one embodiment, the machine-readable portion of the code provides a unique study ID. In one embodiment the machine-readable portion of the code is an index that maps to a sparse study ID index table.

In one embodiment, error detection of the human-readable portion of the animal code is provided by using a sparse animal ID index table, wherein an animal code that does not map to a valid animal ID is detected as a read error in the animal code.

In one embodiment, error detection of the machine-readable portion of the animal code is provided by using a sparse study ID index table, wherein a machine-readable portion that does not map to a valid study ID is detected as a read error for the machine-readable portion of the animal code.

In one embodiment the machine-readable portion of the animal code must map to a valid study ID and, in addition, the human-readable portion of the animal code must map to a valid animal ID table in the animal ID index table for the valid study ID. In this way the mapping of both the machine-readable portion and the human-readable portion must properly map within sparse tables for a read to be valid.

In one embodiment the human-readable marking is also machine-readable.

In one embodiment the number used for the human-readable marking and the number used for the machine-readable marking are combined into a number looked up in a single animal ID table. The animal ID table provides key information about the animal, such as its study, cage number, and much more information. The animal ID table likely provides links of some type to additional data. Entries in the animal ID table may be the target links of links from other tables or sources. Additional data may be used for lookups, such as time, a cage, and the like.

In some embodiments either the numbers used for the human-readable markings, or the numbers used for the machine-readable markings, or both, are selected by a method that minimizes potential read errors by maximizing the multi-dimensional "distance" between used markings.

One such type of distance measurement is Hamming distance, although methods of determining distance may be used.

Note that there is no specific requirement, in some embodiments, for the human-readable portion to be specifically associated with an animal ID within one study, and there is no specific requirement that the machine-readable portion be specifically associated with a study ID. For example, in one embodiment, the combined machine-readable and the human-readable portions may be viewed as a single animal code into a larger, sparse table that provides both a study ID and an animal ID, for that animal code. The human-readable portion might also be unique within a study, or other scope, such that the human-readable portion is sufficient to identify an animal within a vivarium application. Combining the human-readable portion with the machine-readable portion provides a far larger potential code space, making the corresponding index table much sparser, increasing the change that a misread of the entire code will be caught.

Animal codes portions, for either portion of the animal code, may be assigned randomly, pseudo-randomly, or by the use of other assignment algorithms. A key goal of any such assignment algorithm is that likely or random misreads have a high, or equal, probability of being caught. Such mapping algorithms are well known in the art. Ideally, animal codes, animal IDs, study codes and study IDs are distributed in an apparent arbitrary or random throughout the available corresponding code spaces.

One embodiment uses a vine code for the machine-readable portion. By vine code we mean a code using a sequence of parallel lines segments of varying length, and optionally a variable offset from a perpendicular read axis. This class of codes is well known including such standard codes as PostBar, POSTNET and RM4SCC. Machine-readable codes include barcodes, 2D (or matrix) codes, OCR, and many others. Traditional barcodes generally vary either the width of the bar or the spacing between the bars (or both) for encoding. 2D (or matrix) codes typically have a 2D grid or arrangement of cells wherein each cell is on or off, such as black or white. In the case of vine codes, neither the width of the bar nor the spacing between bars changes. Barcode terminology varies greatly. Therefore it is necessary to construe terms associated with barcodes in the context in which they are used.

There are a large number of proposed, previously used, and currently used machine-readable codes. Most of these were created to meet the needs of a particular application, such as postal codes on envelopes or fruit codes on oval fruit stickers. Embodiments of this invention include codes optimized for the application of this invention: machine-readable markings on rodent tails.

One embodiment comprises a vine code with a spine. The spine is a line along the read axis; that is, perpendicular to the parallel line segments that make up leaves. In prior art bar codes are normally though of as horizontal. However, in this application for convenience we think of a vine code and thus its spines as vertical, with orthogonal bars, or leaves, as horizontal with leaf elements identified as left or right. PostBar, POSTNET and RM4SCC do not use an explicit spine. These codes were designed for use on envelopes, for example, that do not significantly distort. Prior art vine codes use a variety of encodings, often have special segments within a printed code that are encoded differently, may or may not use "start" and "stop" codes, may or may not use parity, and may or may not use error-correction elements. Prior art vine codes are not configured to support printing or reading on curves. Prior art vine codes do not have an ability to mark out or delete a leaf, or to add a replacement leaf.

However, rodent tails are very flexible and reading a code on a rodent tail must deal with the tail being straight or significantly curved. In addition, the tail may be rotated so that the "center" of the parallel line segments, or the reference axis or reference line, is hard to determine. Thus, for the particular application of this invention, a visible spine permits video analytics (or other machine vision) to track the tail curvature, rotation and position, and thereby reliably read the leaf locations, positions, and length reliably.

For convenience we refer to each line segment or bar as a "leaf." There may or may not be a starting or an ending leaf. In one embodiment a leaf that is longer than an otherwise valid leaf length is specifically reserved to mark that leaf as "deleted." In some embodiments a replacement leaf may be provided either following the deleted leaf, or at the end of the vine code, or in another location.

In one embodiment, each leaf (if not deleted) encodes two bits. The leaf segments may be left, right, full width, or missing (for a null leaf). In addition, an extra long leaf may denote a "deleted" leaf.

Note that it is desirable, and used in some embodiments, to use a hash or another "randomization" one-to-one transformation to create pseudo-random bit streams or high-entropy bits streams within the vine code so that there is an unlikely chance of a long string of "zeroes" which might be encoded as a null leaf. Another method of preventing this situation is simply not use any such animal codes. Since they are indexes, there is no loss of arbitrary animal IDs or study IDS, up to the codes space size available. Yet another method is the use of several well know line codes or run length limited (RLL) code maps, such as 5b/6b, 8b/10b, RLL (2,7) or RLL (1,7) that assure a maximum run-length of either consecutive zeros or ones. Alternatively, a convolution code may be used.

For the human-readable portion, it is desirable to have code symbols that can be easily and reliably marked, such as by tattooing. Also, the symbols should be able to be quickly and reliably read by humans. In one embodiment, all such symbols are created from seven connected line segments, where each segment is present or absent, the segments are all parallel or perpendicular to each other, and the seven segments, if all present form the digit, "8." Such a format is well known in the art as a "seven-segment display." Such displays do a good job of presenting human-readable digits 0 through 9. However, displaying the complete roman capital letter alphabet (A through Z) in such a display requires mapping some letters to unconventional forms. We refer generally to this encoding per character as "seven segment."

Therefore, for one embodiment, a reduced alphanumeric symbol set is used. This set is created by starting with a 36-symbol set of ten digits plus 26 letters, then deleting all symbols that either (i) look like another symbol in the set, or (ii) cannot be readily mapped to an easily recognizable capital letter in the "seven segment" format. One such character set uses the characters shown in FIG. 5B. Alternative character sets created by the same or similar rules, for the same purpose, are specifically claimed under the Rule of Equivalents. This includes, for example, the addition of symbols or lower-case letters. This includes, for example, deletion of d, n, r, or T.

A simple robot, or machine, is described below that is suitable for automatic marking of the described codes on a rodent tail.

Novelty

A novelty of embodiments is to use both a human-readable marking portion and a machine-readable marking portion. Such two portions may be markings from a human-readable encoding and a machine-readable encoding. In one embodiment these two portions use different encodings. In one embodiment, these animal code portions are marked on an animal's tail, such as a rodent tail. In one embodiment the animal code portions are tattooed. The tattooing may be manual or automated.

FIG. 1 shows an exemplary human-readable marking 11 and an exemplary machine-readable marking 12 on a rodent tail 13. 10 is the body end of the tail; 13 is the tip of the tail. 14 shows a partial rodent body.

In some embodiments the human-readable marking is also machine-readable.

In some embodiments, the human-readable marking portion is unique within a first population, such as a single study. In some embodiments, the combination of the human-readable marking and the machine-readable marking is unique for all live animals in a vivarium. In some embodiments a combination of the human-readable marking, the machine-readable marking, and a read time is unique for all suitably marked animals in the vivarium, independent if the animal is dead or alive.

In some embodiments, the selection of human-readable markings, or the selection of machine-readable markings, or both, are selected on the basis of maximizing Hamming distance of sub-symbols (i.e., Hamming symbols) within the marked codes.

Not all embodiments have the above limitations.

Continuing with FIG. 1, we see both a human-readable marking 11 and a machine-readable marking 12 marked on a rodent tail 13. The rodent may be a mouse. The method of marking may be tattooing.

Continuing with FIG. 1, the machine-readable marking portion 12 may be a vine code, with or without a spine. It may be a barcode known in the art. The spine is aligned with the tail such that the code is easy to read with machine vision, as the spine clearly demarks the location and curvature of the tail, and also provides a reference point for determining if the bars, (or "leaves") in the code are left, right, full-width or null. A rodent tail may not only curve dynamically with rodent activity, but also rotate around the tail axis. The tail may also curve upward. Thus, a code spine is valuable to determine all such distortions from an ideal, flat, rectangular, fixed substrate for the code marking. In addition, the tail may be partially covered with detritus, such as bedding or other material. A continuous spine makes if far easier to determine reliably if a portion of the machine-readable marking is so obscured. In addition, a printed spine may be used to determine the start and end of the printed code; that is, the locations of the first and last leaf. This is particularly important when the first or last leaf is a null leaf.

Prior art required white or black cage bottoms to machine-read a tail barcode. Prior art required cages to be free of bedding, as that might obscure a portion of the code, causing a misread. Use of a vine code with a spine eliminates these requirements as the dark markings on a light tail provide sufficient contrast, and use of a spine does not require that the edges of the tail be identifiable.

In some embodiments, either the human-readable or the machine-readable marking portions 11 and 12 respectively is an identifier within a known scope. In some embodiments such a scope might be all animals in a study or in a set of cages, or require a particular procedure or observation. In some embodiments the scope is all the live animals in a vivarium. In some embodiments the scope is all the animals in a group of vivaria.

In some embodiments the combination of the human-readable and the machine-readable marking portions is an animal identifier within a known scope, such as all live animals.

The combination of the human-readable and the machine-readable marking portions may be a third animal code, where the third animal code must be looked up in a third animal code mapping table comprises an entry (field) comprising to a primary key that uniquely identifies an animal.

The code space of the machine-readable marking portion may be no more than 10,000; 100,000; 1,000,000; 10,000,000; or 100,000,000. The code space of the machine-readable marking portion may be no more than 12 bits, 14 bits, 16 bits, 18 bits, 20 bits, 22 bits 24 bits, 26 bits, or 28 bits. The code space of the machine-readable marking portion may in the range of 12-14 bits, 12-16 bits, 14-18 bits, 16-20 bits, 18-22 bits, 20-24 bits, or 22-28 bits, 14-20 bits, or 16-28 bits. The machine-readable marking portion may or may not comprise check bits, parity bits, checksums, CRC, and forward error correction.

The animal in FIG. 1 on which both a human-readable marking and a machine-readable marking have been placed may have no additional placed markings. Indeed, the ability to identify animal with no additional markings are the benefits of key embodiments.

Figure 2:
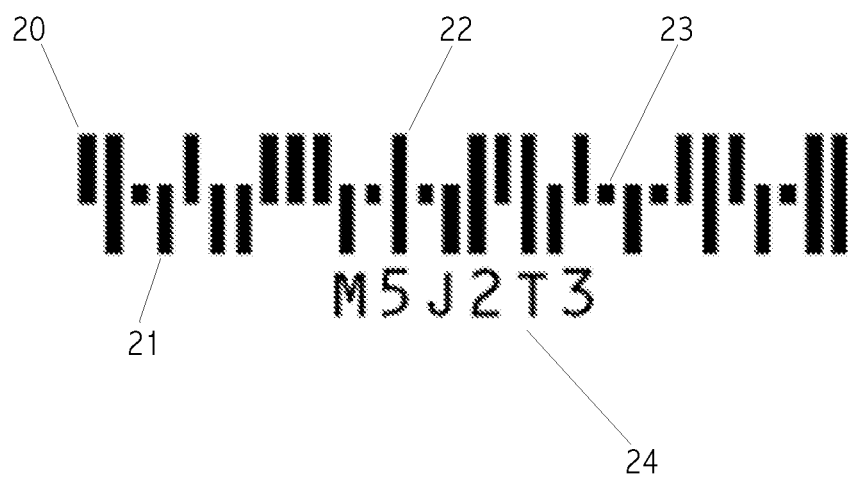
FIG. 2 shows prior art.

Turning now to FIG. 2 we see exemplary prior art. There is no visible spine. An ascender bar or leaf is shown 20. A descender leaf 21 is shown. A full-height leaf 22 is shown. A minimal leaf 23 is shown. The machine-readable marking in this Figure is made human-readable by replicating the data in the code as text 24. Note that this code has no null leaves and no printed spine.

FIG. 2 shows a prior art vine code. This is an example of one of a number of postal code symbologies. Prior art vine code symbologies do not have a marked spine. Prior art vine code symbologies have no provision for marking a bar as deleted and have no provision for adding a replacement bar for a deleted bar. Prior art vine code symbologies use pre-determined encodings and do not use a dynamic lookup table to map from a printed code to an actual identifier, such as a primary key or other animal ID. That is, prior art codes are merely fixed definition fonts, not an index.

Figure 3:
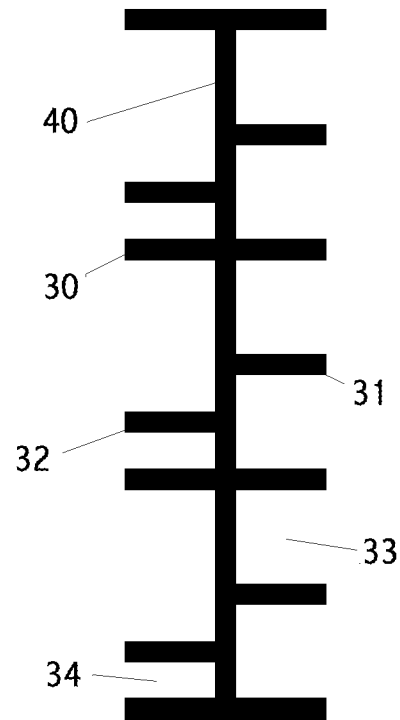
FIG. 3 shows an exemplary vine code with a spine.

Turning now to FIG. 3, we see an exemplary vine code of one embodiment. 30 is a full-width leaf. 31 is a right leaf. 32 is a left leaf. Location 33 shows a null leaf. 34 shows a fixed-width gap between leaves. Null leaves, such as 33, are detected by noticing that the gap between adjacent leaves is twice the fixed-width gap 34 plus the thickness of one line segment. A null leaf is also detected when the start or end of the spine extends past the last visible leaf. Note that the prior art code in FIG. 2 does not have null leaves.

In some embodiments, each leaf of the vine code may encode two bits each. In some embodiments, two bits may be encoded as one of: (i) a right leaf 31; (ii) a left leaf 32; (iii) a full-width leaf 30; or (iv) a null leaf 33. In some embodiments a leaf that is longer than a full-width leaf may be used to indicate a deleted leaf position or a marking error. In this Figure, line width is not part of the coding. In this Figure, the spacing 34 between leaves is fixed: line thickness is not part of the coding. In one embodiment, line spacing 34 is not fixed and is not part of the coding either. An advantage over prior art is that by ignoring line thickness in the coding, the significant real-time and growth-based dynamics of a rodent tail do not distort the marked code so as to reduce the reliability of reads or cause misreads. Even if any such misread rate is low, the misread rate is not accurately computable. In addition, both line thickness and line spacing are difficult to control when tattooing, whether the tattooing is done manually or by a robot.

An exemplary vine code, such as shown in FIG. 3, may encode 8-14 bits, 12-16 bits, 14-18 bits, 16-20 bits, 18-22 bits, 20-24 bits, or 22-28 bits, 14-20 bits, or 8-28 bits. The vine code may or may not comprise check bits, parity bits, checksums, CRC, and forward error correction. Specific vine codes to mark may be selected such that a Hamming distance, where the "Hamming symbols" are each short line segment in a leaf, is maximized amongst all used codes, or amongst a subset of used codes. All leaves in the shown code have two short line segments. A full width leaf has two marked short line segment regions. A null leaf has two unmarked short line segments. Left and right leaves have one marked and one unmarked short line segment.

Figure 4:
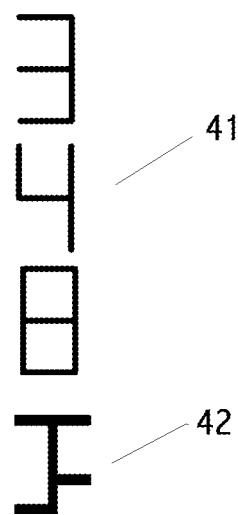
FIG. 4 shows a combined human-readable and machine-readable marking combination.

Turing now to FIG. 4, we see an exemplary combination of both a human-readable marking portion 41 and a machine-readable marking portion 42. Here the human-readable marking 41 is of the number 348. The characters are printed in the common "seven-segment" format. However, other fonts or character formats may be used. The machine-readable marking 42 is a four-leave vine code where each leaf is one of four possible leaf symbols. This code marking has a spine, which is vertical in the Figure. The top-most leaf is full-width. The second leaf is null. The third leave is right. The fourth leaf is left. Thus, 42 in this Figure shows all four leaf symbols. This code encodes 2*4=8 bits, or 256 possible input values. The three-digit numeric marking codes 1000 possible input values, from 0 to 999. Thus, the combination of the human-readable marking and the machine-readable marking encodes 256*1000=256,000 possible input values.

Turning now to FIGS. 5A and 5B, we see an exemplary symbology for the characters in a human-readable marking. All characters may be formed by a non-empty subset of seven straight-line segments, arranged in a well-known "seven-segment" formation. The use of this formation is uniquely advantageous for tattooing rodent tails because each line segment may be formed by motion along only one axis. The motion may be manual or automated. Either the rodent (or the platform on which the rodent rests) may be moved, or the tattooing apparatus may be moved. In one embodiment, motion along the axis of the tail is implemented by supporting a tattooing head on a linear track, which in turn may be supported by a gantry or other support structure. In one embodiment, the other axis may be implemented by rotating the tail around the tail axis. For manual tattooing, such rotation may be via one or more finger(s) gently placed on the tail. For automatic tattooing, a motorized rubber finger or fingers may be used, effectively operating similar to manual operation. Tattooing movement along only one axis at a time is far easier for human operators, which is a unique problem, and for which this code symbology is a novel solution. See also FIG. 8.

FIG. 5A shows an exemplary coded mark, here the three characters "348," using the exemplary symbol set shown in FIG. 5B. Note that all symbols shown in FIG. 5B may be formed from a subset of the seven-segment line segments. Note that all symbols shown in FIG. 5B are readily identifiable without confusion with other symbols, and also readily memorized in codes. The marking shown in FIG. 5A may also use only decimal digits as its input set.

The symbol set for the human-readable marking may comprise an alphanumeric character set comprising digits and Roman letters such as shown in FIG. 5B. The human-readable marking may comprise only digits, as shown in FIG. 5A. The human-readable marking may comprise an alphanumeric character set comprising digits and limited Roman letters such that the remaining Roman letters in the character set are easily recognizable and clearly distinguishable from digits or other Roman characters. The human-readable marking portion may be one character, two characters, three characters, four characters, or five characters, or the range of 1-2, 1-3, 1-4, 2-3, 2-4, or 3-4 characters. One such reduced character set is shown in FIG. 5B. Here, the letters "D" and "N" are represented more closely to their traditional lower case appearance: "d" and "n" respectively. The letters T and Y appear asymmetric in the code; however, they are still easily identifiable by people. Within the context of our claims, we explicitly claim all similar reduced character sets, similarly reduced for readability in a seven-segment format, under the Rule of Equivalents.

FIG. 5C shows Roman characters not used in the exemplary symbol set due to their similarity to other digits or characters.

Another embodiment uses the seven line-segment basis expanded to nine segments by the addition of two, three, or four diagonal segments in the upper and lower rectangles formed within the digit "8." The addition of these diagonal segments permits the full 36-character alphanumeric character set to be distinctly marked.

Numeric only and alpha only symbol sets are expressly claimed as alternative embodiments to an alphanumeric symbols set.

Figure 6:
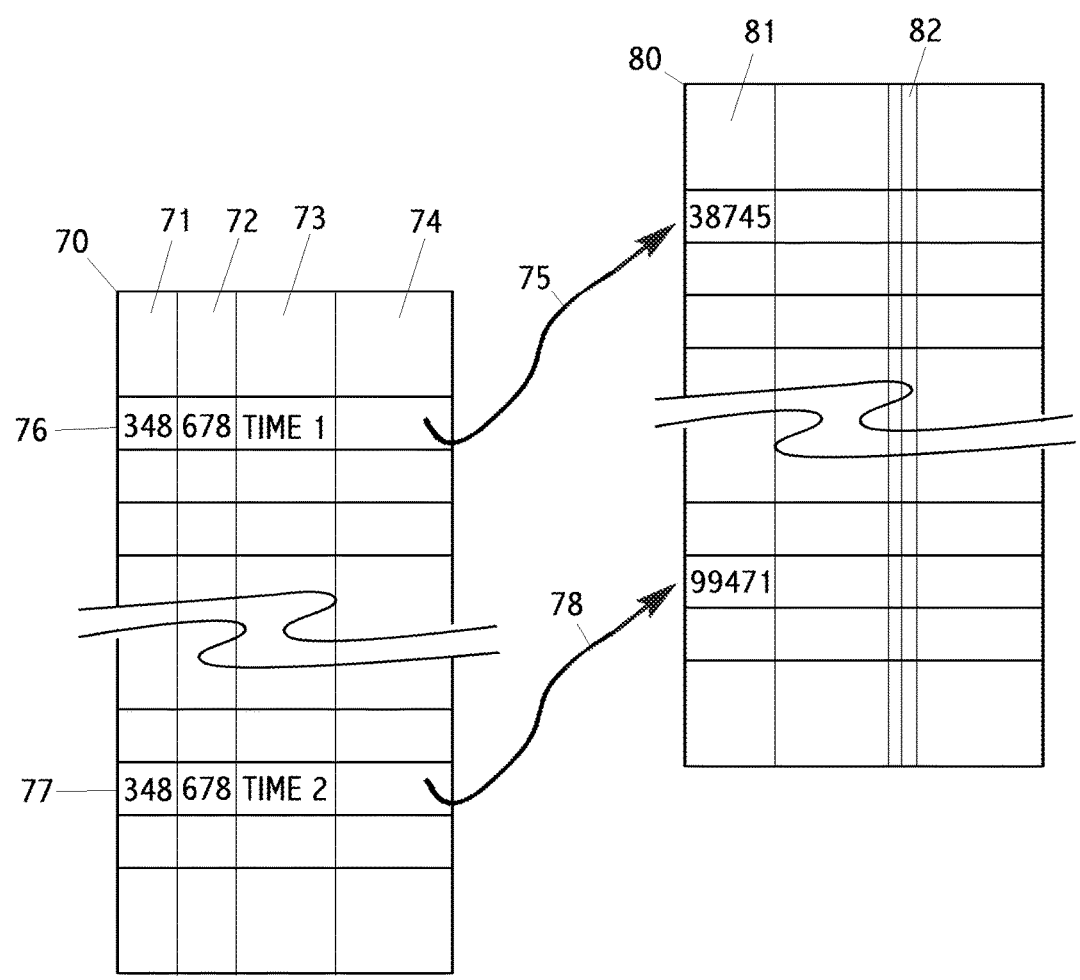
FIG. 6 shows a combination code table with time windows and a primary key table.

Turning now to FIG. 6, we see exemplary elements of important embodiments. Table 70 is a "marking table" that may be used to look up a given marking on an animal. Column 71 contains values of a human-readable marking. Column 72 contains values of a machine-readable marking. Column 73 contains a time window. Column 74 contains a link to a primary key, or a value of a primary key. If a particular human-readable marking value, machine-readable marking value, and time is in the table, such as shown in row 76 and 77, then the link in column 74 will point to a valid primary key. If a particular human-readable marking value, machine-readable marking value, and time is not in the table, there may be no matching table row, or the field in column 74 may be null, or there is indeed an entry for a primary key but the record, in table 80, shows that the primary key is not valid for this read context. Note that typically a lookup in table 70 has a "read time" associated with it. For the lookup to have a valid row in the table, the read time must be within the time window in the field in column 73. Roughly, each valid row in table 70, such as rows 76 and 77, corresponds to one animal. Note that the same human-readable marking and same machine-readable marking may be marked on two different animals, at different times. For example, rows 76 and 77 show this. The time window values of TIME 1 and TIME 2 do not overlap. Thus, for any given read time, at most only one read row would be valid. Typically, time windows are associated with a lifetime or expected lifetime of an animal.

Table 80 is the primary key table. Column 81 holds the field for the primary key. The primary key is unique for all animals participating in this system. For example, it may be unique for all animals ever in a vivarium or in a group of vivaria. 82 shows schematically other fields in each record. Typically, there may be 30 to 50 fields, comprising information such as species, source, birthdate, cage number, one or more studies, treatments, outcomes, death date, links to other information, and much more information about a single animal per primary key. Table 80 shows primary keys for two animals, 38745 and 99471. These animals would not be alive at the same time because we see from rows 76 and 77 in table 70 that they have the same code markings.

Note that FIG. 6 is illustrative only, showing tables 70 and 80 as flat tables. In practice, many other implementations are possible, such as the use of relational databases, objects, dictionaries, arrays, other table types, and the like. Arrows 75 and 78 show the relationship between the records 76 and 77 in table 70 and the records associated with primary keys 38745 and 99471 in table 80, respectively.

Figure 7:
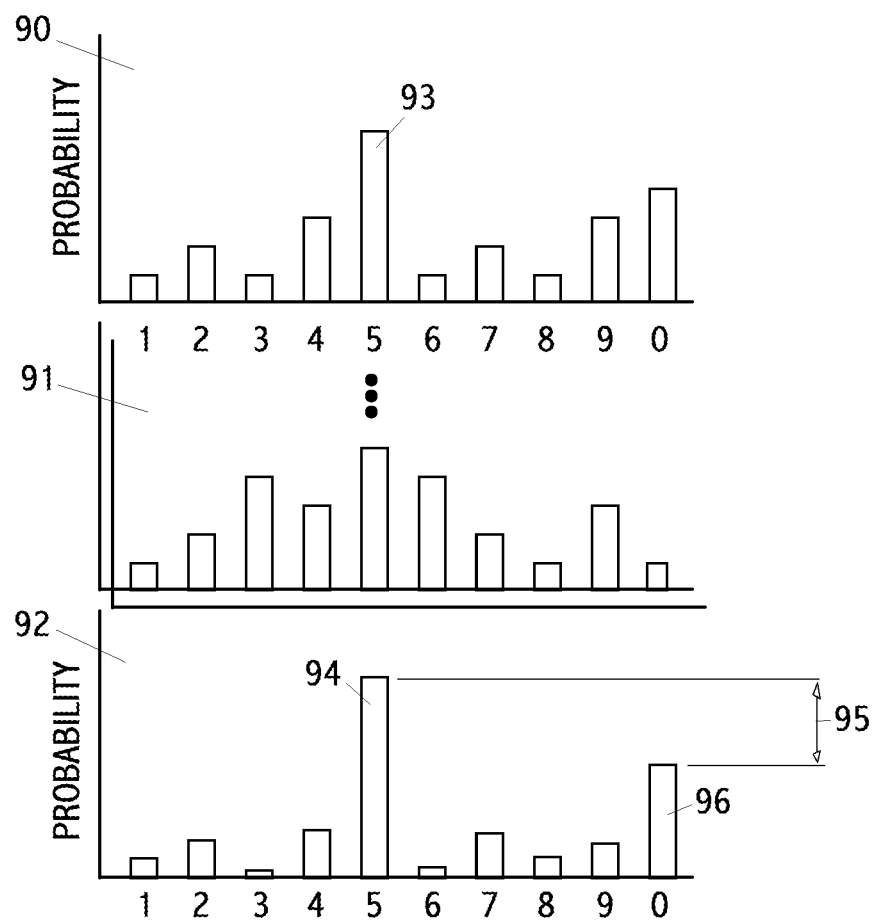
FIG. 7 shows multiple probability sets.

FIG. 7 shows one method of reading marked codes. Here a code symbol being read has one of ten values, shown as the digits 1 through 9 and zero. Table 90 shows the results of image processing for one frame. The height of each of the ten bars represents a relative or absolute probability that the mark is actually the symbol of that column. Tables 91 show similar tables where each table is from a different frame, however for the same location on the same animal tail. Table 92 shows the sum or average of all of the tables in 90 and 91. There may be 2 to 100 such individual tables. As can be seen in bar 95, the symbol has the most likelihood of being a "5." It has a lower likelihood of being the symbol, "0," shown as the height of bar 96. The distance 95 shows the relative or absolute probability difference that the symbol is a "5" versus a "0."

A method similar to the one shown in FIG. 7 may be used to read machine-readable markings such as a vine code. In this case, there would be four values in each table, rather than ten. For either the human-readable marking where each symbol is a digit or the machine-readable marking where each symbol is a leaf, this process is repeated for each symbol. For example, if the marked code comprises three digits, the process shown in the Figure would be repeated three times. If the marked code comprises four leaves, the process shown in the Figure would be repeated four times. The most probably symbol for each position is then looked up in table 70 from FIG. 6. If there is no valid entry, then a next most likely symbol may be substituted, such as shown by bar 96 in FIG. 7. In this way, the first most probably set of symbols that is valid is chosen.

FIG. 8 shows an automated or manual marking machine. Here, 50 is a mouse on a work surface 51. Rollers 55 are used to roll the tail back and forth. Such motion may be used to mark line segments perpendicular to the tail, 57. 56 and 57 show the mouse tail. 56 is nearer the tip of the tail; this region is not suitable for marking. 57 shows a tail portion closer to the body of the mouse; this region is suitable for marking. A marking head, such as a tattooing head is shown as 53. The head is supported on a frame, 52. The head is capable of two directions of motion as shown by the arrows: axially along the tail and vertically to raise or lower a tattoo tip, 54.

FIGS. 9A and 9B provide a helpful illustration of one embodiment. In FIG. 9A we see that a first number passes through a first encoding to generate a first marking. A second number passes through a second encoding to generate a second marking. The first and second markings are both marked on a first animal; let's call this first animal, "Bob." A first primary key is associated uniquely with Bob; we can call this primary key, "Bob's primary key." Bob's primary key is unique for all animals in a first population, such as all animals ever in a vivarium. A first time window is associated with Bob's primary key. A combination of the first number, the second number, and a time may be used to index to, that is, locate uniquely, Bob's primary key. The number may be viewed as an input to the encoding and the marking may be viewed as an output. The encoding may be the use of a font.

FIG. 9B shows a second animal, which we can call, "Alice." The same first and second numbers pass through the same first and second encodings to generate the same first and second markings as for Bob in FIG. 9A. These same first and second markings are marked on Alice. Alice also has a primary key. Since her primary key is unique it is inherently different than Bob's primary key. A second time window is associated Alice's primary key. A combination of the first number, the second number, and a time may be used to index to, that is, locate uniquely, Alice's primary key. Clearly the time used for the Bob's primary key lookup is different than the time used for Alice's primary key lookup. The number may be viewed as an input to the encoding and the marking may be viewed as an output.

For FIGS. 9A and 9B the lifetimes of Bob and Alice do not overlap. Thus, in practice, although they both have the same markings, any reading of those markings can be used to distinguish Alice from Bob by the time of the reading.

In one embodiment both the first and second animals are free of any additional markings.

In some embodiments, animals in a second animal population, smaller than the first population, such as animals in one study, have unique first markings.

Human-readable markings may also be machine-readable.

In most cases, there is nothing to prevent a person from reading a machine-readable marking.

The head 53 and the tail rollers may be operated manually or may be automated. Many different configurations of manual and automated marking devices are possible. For manual operation, fingers may replace the rollers 55 and the head 53 may be a hand-held tattooing head. As shown schematically, such a machine is capable of marking both human-readable and machine-readable markings. FIG. 1 shows an exemplary result of marking a rodent tail.

Both control of the operation of the machine of FIG. 8 and the verification of correctly marked codes may be performed by the use of a single video camera, not shown in this Figure. Such use of a single camera for both purposes is an embodiment.

An alternative embodiment to traditionally tattooing is to damage, abrade or puncture the skin on the rodent tail either before after applying ink. Such action may be caused by an automatically controlee needle or knife, or a laser. In one embodiment the ink is applied manually, in bulk, either before or after damaging, abrading or puncturing the skin in the pattern to be marked on the tail.

An alternative embodiment to traditionally tattooing is using an ink jet printer print head to apply ink. The skin of the rodent tail may be damaged, abraded or punctured prior to applying the ink via the print head. One advantage of using an ink jet print head is the ability to easily use colored ink. Such an embodiment is specifically claimed. In one embodiment this color is used to identify a mouse within the scope of one cage. The color may be part of one of the code portions described herein, or may be an additional marking.

An embodiment comprises reading codes as described herein, including devices of reading and methods of reading. Embodiments include systems that use both reading and writing, which might be use, for example, as a comprehensive animal identification system in a vivarium.

Additional Embodiments

Embodiments of this invention explicitly include all combinations and sub-combinations of all features, elements and limitation of all claims. Embodiments of this invention explicitly include all combinations and sub-combinations of all features, elements, examples, embodiments, tables, values, ranges, and drawings in the specification and drawings. Embodiments of this invention explicitly include devices and systems to implement any combination of all methods described in the claims, specification and drawings.

Embodiments specifically include all independent claim limitations in all combinations with all independent claims.

Embodiments are claimed wherein the word "comprises" is replaced with the word, "consists," in one or more places in a claim.

Definitions

Code—The term, "code" has three different meanings depending on context. (i) It may be a method, algorithm, set of rules, or a standard of creating a mark or marking from an input, such as number or alphanumerics. For this meaning the word or process, "encoding" may be used, instead. (i) It may refer to the mark or marking itself. (iii) It may refer to entire process that comprises the first method, (i), as only a part of that process. For meanings (i) and (iii), one may consider that the encoding has an "input" and an "output." Nearly all encodings have a reverse "decoding." The input to an encoding may have a well-defined input symbol sets. The output of an encoding will have a well-defined output symbol set. An encoding may be the use of a font.

Combination—any combination of members of a set, including a null set and all members of a set, unless otherwise stated or obvious. The elements of the combination may be ordered or unordered. The elements may have fixed positions, or may have variable positions, or may have no positions.

Distance—The distance between two elements may be viewed generally as a Hamming distance, although different embodiments may compute distance differently, including modifications to a traditional Hamming distance. See www- .wikipedia.org for industry technical description of Hamming codes. For embodiments herein, for numeric characters based on a "seven-segment" layout, each "hamming symbol" is one of the seven segments. The Hamming space may then be viewed as a binary 7-dimensional space. For leaves in a vine code where each leaf has four possible states (e.g. length) the Hamming space is a binary space with 4 dimensions. A distance for two specific single symbols in a symbol set generally sums the Hamming distance for all pairs of elements (where these elements are the "Hamming symbols") of the two symbols. A distance for a first group of symbols and a second group of symbols generally sums the Hamming distance for all respective pairs of symbols in the two groups. However, minimums or maximum distance may be used for selection. Note it is important to distinguish "Hamming symbols" from symbols marked as outputs from codes, such as one full decimal digit or one full leaf in a vine code. As a shortcut of referring to the Hamming distance (or other distance calculation) of output symbols from an encoding we may refer only to the distance of two input symbols or input values.

Distinct—two or more elements are distinct if they are not the same, or not effectively the same in the described context. For example, two numbers are distinct if they are not the same number. Two or more elements may be non-tangible or abstract elements, such as the set of numeric characters and the set of alphanumeric characters, or calculus and algebra. As another example, Code 39 is distinct from Code EAN 5.

Leaves—see definition for vine code. A null leaf is one that has no marking in the location for that leaf.

Pathogen-free—means the population of microbes, including but not limited to bacteria, viruses, prions and toxins, relevant to the experiment, are sufficiently reduced to meet the needs of the study, or to not impact the health, performance or behavior of the target animal population or of the workers.

Primary cage or home cage—the cage in which an animal spends more time than any other cage. Of note, there is a related term of art: "home cage." The definition of primary cage is, in some embodiments, the home cage. An aspect of home cage/primary cage deals with the fungibility of the actual cage itself. Each time a cage is changed, the physical cage is generally either disposed of or removed for washing, and replaced by a clean cage. The new physical cage is considered the same primary cage. A primary cage may sometimes be distinguished from a non-primary cage by the purpose of the cage. For example, a home cage may be for living in, as compared to an experimental cage to which the animal is transferred that is equipped or located for one or more particular experiments for the applicable study.

Sealed enclosure—an enclosure sealed against pathogens that impact or alter study results, or alter the credibility or repeatability of study results, entering or leaving the enclosure.

Sensor—may or may not include the use of local or remote processors, and may or may not include local or remote software executing on the local or remote processors. Sensors may or may not communicate over a network. Multiple sensors may or may not include common elements.

Spine—see definition for vine code.

Sterile—pathogen-free.

The primary cage is different from special purpose, behavioral-measurement, behavioral-detection, or behavioral-observation cages that are generally used for only a short time for the duration of a particular test due to cost and mindset.

Unique—occurs only once in the context or set defined to contain the element

Vine code—a code, generally machine-readable, generally not commonly human-readable, comprising a series of line segments of varying lengths, or varying positions, or both. Typically the line segments are placed parallel to each other with a gap in between. An axis may be defined perpendicular to such parallel line segments. The line segments may have one end aligned with the axis or may, in some cases, cross or not cross the axis depending on the choice of the line segment. Data is encoded in in the vine code by the variations in line length or position. Each line segment is called a leaf. The vine code may or may have starting or ending line segments, or both. Such starting or ending line segments may or may not encode data. Some leaves in some codes are missing. Generally, all line segments are equally spaced relative to the axis. The axis may or may not be printed or readable. A vine code may be marked in visible ink or may be marked using some other readable technology, including infrared, ultraviolet or magnet material. A vine code may be overlaid with another code such that they can be read independently. For example, a vine code may be printed in infrared ink while a human-readable marking is printed overlaid in violet or blue ink. Filters may then be used to select one code over the other for reading. A human eye would not normally be able to see the infrared or ultraviolet ink.

Ideal, Ideally, Optimum and Preferred—Use of the words, "ideal," "ideally," "optimum," "optimum," "should" and "preferred," when used in the context of describing this invention, refer specifically a best mode for one or more embodiments for one or more applications of this invention. Such best modes are non-limiting, and may not be the best mode for all embodiments, applications, or implementation technologies, as one trained in the art will appreciate.

May, Could, Option, Mode, Alternative and Feature—Use of the words, "may," "could," "can," "option," "optional," "mode," "alternative," "typical," "ideal," and "feature," when used in the context of describing this invention, refer specifically to various embodiments of this invention. Described benefits refer only to those embodiments that provide that benefit. All descriptions herein are non-limiting, as one trained in the art appreciates.

What is claimed is:

1. An animal identification code comprising:
   a first number;
      wherein the first number is suitable to be encoded by a first encoding;
   a second number;
      wherein the second number is suitable to be encoded by a second encoding;
   a first marking;
      wherein the first marking is an output of the first number and the first encoding, and wherein the first marking is human-readable, and wherein the first marking is marked on a first animal;
   a second marking;
      wherein the second marking is an output of the second number and the second encoding, and wherein the second marking is machine-readable, and wherein the second marking is marked on the first animal;
   a first primary key;
   wherein a combination of the first number, the second number, and a first time window is associated with the first primary key and not associated with any other primary key; and wherein the first time window is associated with a lifetime of the first animal;

wherein the first primary key is associated uniquely with the first animal in a first animal population; and wherein an each animal in the first animal population is associated with an each respective primary key, and wherein at least some animals in the first animal population have non-overlapping lifetimes;

a second primary key;

wherein the first marking is marked on a second animal; and wherein the second marking is marked on the second animal;

wherein a combination of the first number, the second number, and a second time window are associated with the second primary key and not associated with any other primary key; and wherein the second time window is associated with a lifetime of the second animal;

wherein the second primary key is associated uniquely with the second animal in the first animal population;

wherein the first number and second number are distinct;

wherein the first encoding and the second encoding are distinct;

wherein the first and second time windows do not overlap;

wherein the second marking comprises a vine code with a spine.

2. An animal identification code comprising:

a first number;
 wherein the first number is suitable to be encoded by a first encoding;

a second number;
 wherein the second number is suitable to be encoded by a second encoding;

a first marking;
 wherein the first marking is an output of the first number and the first encoding, and wherein the first marking is human-readable, and wherein the first marking is marked on a first animal;

a second marking;
 wherein the second marking is an output of the second number and the second encoding, and wherein the second marking is machine-readable, and wherein the second marking is marked on the first animal;

a first primary key;

wherein a combination of the first number, the second number, and a first time window is associated with the first primary key and not associated with any other primary key; and wherein the first time window is associated with a lifetime of the first animal;

wherein the first primary key is associated uniquely with the first animal in a first animal population; and wherein an each animal in the first animal population is associated with an each respective primary key, and wherein at least some animals in the first animal population have non-overlapping lifetimes;

a second primary key;

wherein the first marking is marked on a second animal; and wherein the second marking is marked on the second animal;

wherein a combination of the first number, the second number, and a second time window are associated with the second primary key and not associated with any other primary key; and wherein the second time window is associated with a lifetime of the second animal;

wherein the second primary key is associated uniquely with the second animal in the first animal population;

wherein the first number and second number are distinct;

wherein the first encoding and the second encoding are distinct;

wherein the first and second time windows do not overlap;

wherein the first marking comprises two to five numeric characters and the second marking code comprises 3 to 8 leaves in a vine code with a spine.

3. An animal identification code comprising:

a first number;
 wherein the first number is suitable to be encoded by a first encoding;

a second number;
 wherein the second number is suitable to be encoded by a second encoding;

a first marking;
 wherein the first marking is an output of the first number and the first encoding, and wherein the first marking is human-readable, and wherein the first marking is marked on a first animal;

a second marking;
 wherein the second marking is an output of the second number and the second encoding, and wherein the second marking is machine-readable, and wherein the second marking is marked on the first animal;

a first primary key;

wherein a combination of the first number, the second number, and a first time window is associated with the first primary key and not associated with any other primary key; and wherein the first time window is associated with a lifetime of the first animal;

wherein the first primary key is associated uniquely with the first animal in a first animal population; and wherein an each animal in the first animal population is associated with an each respective primary key, and wherein at least some animals in the first animal population have non-overlapping lifetimes;

a second primary key;

wherein the first marking is marked on a second animal; and wherein the second marking is marked on the second animal;

wherein a combination of the first number, the second number, and a second time window are associated with the second primary key and not associated with any other primary key; and wherein the second time window is associated with a lifetime of the second animal;

wherein the second primary key is associated uniquely with the second animal in the first animal population;

wherein the first number and second number are distinct;

wherein the first encoding and the second encoding are distinct;

wherein the first and second time windows do not overlap;

wherein the first marking consists of three numeric characters and the second marking code consists of four leaves in a vine code with a spine.

* * * * *